March 10, 1942.    C. S. DRAPER ET AL    2,275,675
DETONATION DETECTOR SYSTEM
Filed May 13, 1938
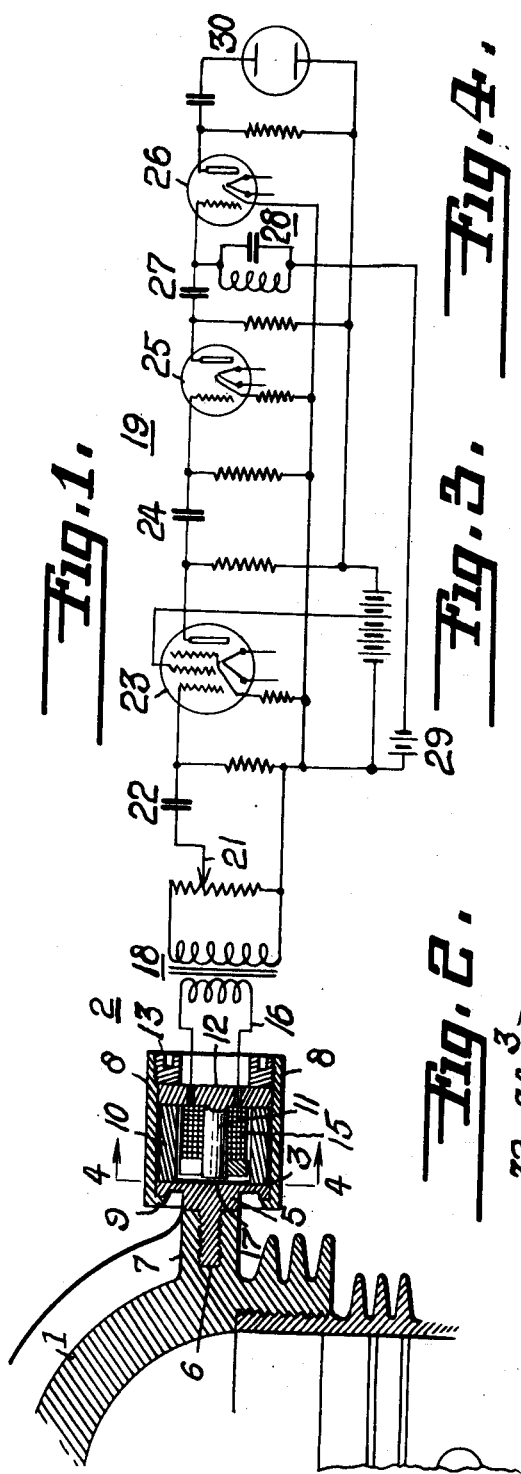
INVENTORS
CHARLES S. DRAPER
JOSEPH H. LANCOR
BY
THEIR ATTORNEY Patented Mar. 10, 1942

2,275,675

UNITED STATES PATENT OFFICE 2,275,675

DETONATION DETECTOR SYSTEM

Charles S. Draper, Boston, Mass., and Joseph H. Lancor, Jr., Edgewood, R. I., assignors to Research Corporation, New York, N. Y., a corporation of New York Application May 13, 1938, Serial No. 207,794

7 Claims. (Cl. 177—311)

This invention relates, generally, to the detection and indication of detonation or "knock" in internal combustion engines, especially engines of this type used for aircraft purposes, and the invention has reference, more particularly, to a novel detonation detector system adapted to be permanently installed on aircraft for serving as a continuously operable means for detecting and indicating detonation.

While detonation or "knocking" in ordinary internal combustion engines, such as those used in commercial land vehicles and automobiles ordinarily reduces the power output of these engines, such detonation is usually not greatly objectionable because engines of this type are built fairly heavy and detonation does not appreciably injure the same. In the case of aircraft engines, however, which are of light construction so as to provide maximum horsepower per pound weight, detonation is a serious thing because as soon as an engine starts to detonate, the cylinder wall is rapidly damaged and burnt away, leading to quick destruction thereof, as is shown by the bright sparks emitted from the engine exhaust, these sparks being portions of the cylinder wall that is actually being eaten away by the detonation.

The principal object of the present invention is to provide a novel detonation detector system that may be readily installed in an aircraft and which serves to reliably and immediately detect and indicate the existence of detonation in the engine or engines of the craft.

Another object of the present invention lies in the provision of a novel detonation detector system of the above character, comprising a pick-up unit that may be easily and readily attached to an external portion of a cylinder of the engine, the said pick-up unit providing an electrical output that is fed through a special amplifying system which, in turn, serves to control the operation of a glow discharge tube that serves to indicate the existence of detonation, should the same occur in the engine at any time.

Still another object of the present invention lies in the provision of a novel detonation detector system of the above character, wherein the operation of the glow discharge tube may be controlled as desired, so that this tube either remains dark or slightly illuminated when no detonation occurs in the engine, the tube becoming very bright as soon as detonation takes place.

Other objects and advantages will become apparent from the specification, taken in connection with the accompanying drawing wherein one embodiment of the invention is illustrated.

In the drawing,

Fig. 1 is a schematic view and wiring diagram illustrating the novel detonation detector system of this invention.

Fig. 2 is a part sectional view of a somewhat modified form of pick-up unit adapted to be used in the system of Fig. 1.

Fig. 3 is a sectional view taken along line 3—3 of Fig. 2.

Fig. 4 is a sectional view taken along line 4—4 of Fig. 1.

Fig. 5 is a graph illustrating the operation of the final amplifier stage.

Similar characters of reference are used in all of the above figures to indicate corresponding parts.

Referring now to Fig. 1, the reference numeral 1 designates the cylinder of an internal combustion engine as of the airplane type. For any style of engine, there is always one cylinder which starts to detonate first and in which detonation is the most severe. The pick-up unit or energy converter 2 of the detonation detector system of this invention is attached to this cylinder of the engine which is most subject to detonation. The pick-up unit 2 comprises an elastic element shown as constituting a circular steel plate or diaphragm 3 provided on the outer end of a stud 5 that is shown provided with a reduced shank 6 rigidly threaded into a suitable aperture provided in a boss 7 formed on the wall of cylinder 1.

A "seismic mass" is carried by the peripheral portion of the elastic element or circular plate 3 and consists of the remainder of the pick-up unit, including a cylindrical open ended shell or housing 8 preferably of non-magnetic material. Shell 8 has an inwardly directed annular flange 9 at the inner end thereof abutting one side of the peripheral edge portion of the elastic element 3, the other side of which is abutted by a hollow cylindrical magnet 10 contained within shell 8 concentric to the axis thereof. A central cylindrical core member 11, preferably of steel, extends axially within shell 8 and is formed on a disc 12 having a sliding fit in shell 8 and which is held pressed against the magnet 10 by a ring nut 13 threaded into the outer end of shell 8. Ring nut 13, acting through disc 12 and magnet 10, serves to fixedly secure these members and the shell 8 upon the peripheral portion of elastic element 3.

Core member 11 carries a winding 15 having output leads 16. The inner end of core member 11 is slightly spaced from the central portion of elastic element 3 to provide a relatively short air gap 17 therebetween.

Leads 16 are connected to the primary of an output transformer 18 that is so designed as to have an upper frequency limit which will not allow frequencies higher than those associated with detonation to pass into the connected amplifier 19. The ordinary detonation range of frequencies extends between 5000 and 20,000 cycles, so that transformer 18 is ordinarily designed so as not to pass frequencies above 20,000 cycles/sec.

The output of transformer 18 passes through a potentiometer having an adjusting arm 21 and through a coupling condenser 22 to the control grid of an amplifier tube 23. Condenser 22 is of such size as not to pass frequencies lower than the lowest frequency in the detonation range, for example 5000 cycles/sec. Amplifier tube 23 of the first stage of amplification is illustrated as a pentode in a simple voltage amplifier stage. The output of tube 23 is passed through coupling condenser 24 to the grid of a triode power amplifier 25 of a second stage which raises the power level to that required by the grid of the third stage tube 26. The output of amplifier 25 is passed through coupling condenser 27 to the grid of tube 26 which is biased by C-battery 29 as a class C amplifier stage, i. e., this grid is biased beyond the point of plate current cut-off. Because of this there will be substantially no output from the stage until the grid signal voltage applied renders the resultant grid voltage $e_g$ close to zero or slightly positive. In this range a small percentage change in input voltage results in a sharp rise in plate output. This is graphically illustrated in Fig. 5, which shows the sharp rise in plate current $i_p$ when a certain grid potential $e_g$ is reached due to the signal voltage $s$ derived from the pick-up unit 2.

The grid circuit of tube 26 includes a parallel resonant circuit 28 adjusted to resonate broadly in the detonation band of frequencies, i. e., 5000 to 20,000 cycles/sec. This circuit adds further to the discrimination against undesired frequencies and presents a low resistance path to direct current which is necessary for successful operation of a class C stage.

The output or plate circuit of tube 26 includes an indicator shown as having the form of a neon tube 30 that serves to visually indicate the existence of a signal of detonation frequency. The characteristic of tube 30 is to emit no light until a certain starting voltage is applied to its electrodes, whereupon the tube becomes illuminated and increases in brilliance as the voltage is raised.

In operation, a vibratory motion of the cylinder I will accelerate the central portion of the elastic element, plate 3, to a greater degree than the seismic mass, consisting of shell 8 and contained parts. This differential acceleration results in relative motion between the center of plate 3 and the pole of core member 11 on the other side of air gap 17, the center of plate 3 moving in phase with the cylinder wall due to its rigid connection thereto. This relative motion changes the reluctance of the air gap and consequently causes a change in the amount of magnetic flux crossing the gap, the circuit of the flux being from magnet 10, plate or element 3, core 11 and disc 12. This change in flux across the gap causes the collapsing or appearing flux lines to cut across the turns of the winding 15, thereby generating a voltage therein proportional to the rate at which the relative motion at the gap changes the flux across the gap. Since the relative motion at the gap according to our invention is substantially proportional to the vibratory acceleration of the cylinder wall, the output voltage of coil 15 will be proportional to the rate of change of this vibratory acceleration. In order that the relative motion at the gap shall be proportional to acceleration of the cylinder wall, as above stated, it will be recognized by those skilled in the art that the natural frequency of our instrument is well above the frequency range used for measurement.

This output signal voltage, if of a frequency not higher than the upper limit of the detonation range, i. e., 20,000 cycles/sec., will pass through transformer 18 and be applied to coupling condenser 22. If the signal voltage frequency is within the detonation range of 5000 to 20,000 cycles/sec. it will be passed by condenser 22 onto the control grid of voltage amplifier tube 23. Voltages of frequencies above and below the detonation range have now been substantially rejected. The output of tube or stage 23 is passed to amplifier 25 and from this tube to amplifier 26. As long as the detonation signal voltage $s$ is below a certain predetermined value, determined at will by the setting of potentiometer arm 21 and the voltage of C-battery 29, the tube 30 will remain dark or slightly illuminated, whichever is desired, but as soon as the signal exceeds this predetermined level the output of tube 26 increases rapidly, corresponding to the existence of serious detonation in cylinder 1, and tube 30 becomes brilliantly illuminated, thereby indicating the existence of such detonation, so that the pilot is thusly advised to adjust his fuel mixture and/or spark so as to stop such detonation in the engine.

In the form of the invention shown in Fig. 2, the elastic element 3' constitutes the "seismic mass" and the remainder of the pick-up unit vibrates with the engine cylinder wall. In this figure a plug 32, preferably of non-magnetic material, has a threaded shank 31 adapted to be threaded into the cylinder boss 7 of Fig. 1. A hollow cylindrical magnet 33 is rigidly carried by plug 32 through use of union 34. A core member 11' extends within magnet 33 and is formed on a disc 12' held in assembled relation to magnet 33 by union 35 pressing against a block of insulation 36 fixed on disc 12'. The elastic element 3' has its periphery rigidly attached as by a press fit to the magnet 33, and a small air gap 17' is provided between the central portion of the element 3' and the pole of core 11'. A winding 15' is provided on core 11' and the terminals thereof are adapted to be connected to leads 16 as in Fig. 1.

The operation of this form of the invention is somewhat similar to that of the preceding figures, the relative motion of the central portion of element 3' and the pole of core 11' being substantially proportional to the vibratory acceleration of the cylinder wall, whereby the output voltage of winding 15' is proportional to the rate of change of this vibratory acceleration, which voltage is adapted to be used as in Fig. 1 for controlling tube or indicator 30.

As many changes could be made in the above construction and many apparently widely different embodiments of this invention could be made without departing from the scope thereof it is intended that all matter contained in th above description or shown in the accompany ing drawing shall be interpreted as illustrative and not in a limiting sense.

What is claimed is:

1. Apparatus for measuring intensity of detonation in a closed chamber, comprising a pick-up unit arranged for external mounting on a closed chamber, said pick-up unit including a coil and a magnetic structure linked with said coil, said structure including flux determining members relatively movable to vary the flux in said structure, the mass and elastic constants of said members and their mounting being suitable to vary the flux in said structure under the influence of vibration of the wall of a chamber mounting the pick-up in a manner to produce in said coil a signal voltage that is a derivative with respect to time of the vibratory acceleration of the wall of said chamber, an amplifier for amplifying said signal voltage, and an indicator controlled from said amplifier.

2. In an apparatus for obtaining as an indication of engine operation, an E. M. F. proportional to the time rate of change of acceleration of a cylinder wall, means for establishing a magnetic flux field, a coil within said field, means external to and externally mounted on the cylinder wall for varying said field in response to the acceleration of said wall, thereby to induce a potential in said coil responsive to the rate of change of said acceleration, and indicating means controlled in response to the potential output of said coil, said indicating means comprising a gaseous tube with spaced electrodes, the said tube having a characteristic such that it emits no light until a certain starting voltage is applied to its electrodes, whereupon its luminosity increases with increasing voltage.

3. In a detonation detector system, a pick-up unit arranged for external attachment to an engine cylinder wall comprising a member having means providing rigid attachment to said wall, a second member spaced from and elastically supported from said first member and forming with said elastic support a vibrating system adapted to vary the gap between said two members in proportion in the vibratory acceleration of the cylinder wall, said pick-up unit having a magnetic flux circuit including the gap between said two members, whereby the flux across said gap is varied substantially in proportion to the vibratory acceleration of the cylinder wall.

4. Apparatus for detecting detonation in a cylinder of an internal combustion engine comprising an elastic diaphragm, means for accelerating a central portion thereof by mechanical connection to the wall of said cylinder, a mass attached to said diaphragm at the periphery and free to move relative to the center thereof, said mass resonating with the effective stiffness of said diaphragm at a frequency substantially higher than any component of acceleration whose rate of change is to be measured, a magnetic circuit including flux producing means, the flux in said circuit varying with the relative movement of said mass and diaphragm, and an electromagnetic generator for generating a voltage in response to said flux variation.

5. Apparatus for detecting detonation in a cylinder of an internal combustion engine comprising a housing adapted to be directly and rigidly attached to the wall of said cylinder, an elastic diaphragm attached at its periphery to said housing and having a natural frequency of vibrations high in comparison with the components of acceleration whose rate of change is to be measured, a magnetic circuit including flux producing means, the flux in said circuit varying with the relative motion of the central portion of said diaphragm and housing, and means for generating an E. M. F. responsive to said flux variation.

6. Apparatus for detecting detonation in a cylinder of an internal combustion engine comprising a housing, means rigidly mounting said housing on said cylinder for movement therewith, flux producing means mounted within said housing including a flux carrying core, a relatively thick elastic plate of permeable material restrained only at its periphery by clamping to said housing and spaced by a flux permeated air gap from said core, said plate having a natural frequency of vibration substantially higher than the range of detonation frequencies, thereby causing the length of said gap to vary and change the flux therein in proportion to the vibratory acceleration of the wall of said cylinder and means for obtaining an electric quantity representative of the rate of change of flux due to variation of said gap as a measure of detonation.

7. In apparatus for detecting detonation in a cylinder of an internal combustion engine a stiff diaphragm of permeable material, mounting means rigidly connecting a central portion of said diaphragm to the cylinder wall for vibration in phase with said wall, a magnet structure mounted on the periphery of said diaphragm, said structure comprising a flux producing means and a central flux carrying core spaced from said central portion of the diaphragm by a flux permeated air gap, the relationship of the stiffness of said diaphragm to the mass of said structure causing said gap to vary substantially in accordance with the acceleration of the wall of said cylinder when vibrating under the influence of detonation, and means actuated by the resulting change of flux in said gap for obtaining a measure of the rate of variation of said gap.

CHARLES S. DRAPER.
JOSEPH H. LANCOR, Jr.